Jan. 29, 1952  E. H. LYON  2,583,700
DEVICE FOR FEEDING CLOSURE CAPS TO CONTAINERS
Filed Feb. 16, 1948
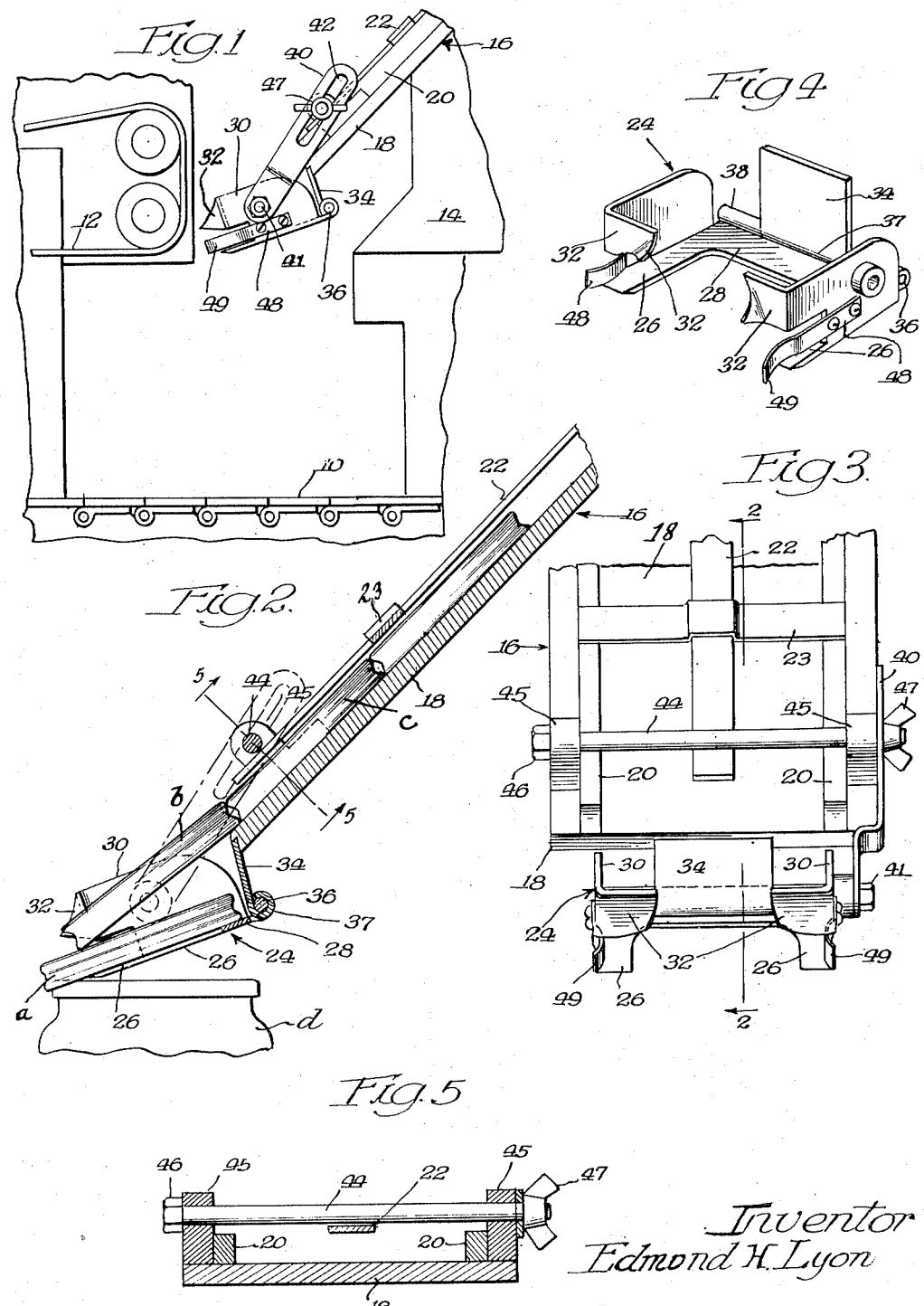
Inventor
Edmond H. Lyon
By: Fred Gerlach
his Atty Patented Jan. 29, 1952

2,583,700

UNITED STATES PATENT OFFICE 2,583,700

DEVICE FOR FEEDING CLOSURE CAPS TO CONTAINERS

Edmond H. Lyon, Evansville, Ind., assignor to Bernardin Bottle Cap Co., Inc., Evansville, Ind., a corporation of Indiana Application February 16, 1948, Serial No. 8,563

8 Claims. (Cl. 226—88.1)

1

The invention relates to apparatus for sealing containers, and more particularly to devices for delivering caps by gravity to a continuously moving line of filled containers in advance of the passage of the containers, such as glass jars, to the mechanism for sealing the caps on the containers.

In practice it is desirable to feed caps by gravity to the continuously conveyed line of filled containers so that the caps will be engaged by the containers and drop into horizontal position on the containers.

One object of the invention is to provide an improved cap delivery device which includes a chute or runway of sufficient inclination to feed the caps by gravity and means for causing the lowermost cap to be positioned more nearly horizontal or paralled to the mouth of the jars when the caps drop onto the containers to insure uniform distribution of the sealing ring in caps around the jars.

Another object of the invention is to provide a cap delivery device of this character, by which the lowermost cap is presented to the jars for engagement thereby at a relatively small angle, and the following cap is delivered to rest by gravity on top of the lowermost cap, and, as the lowermost cap is engaged and moved away from the runway, the succeeding cap will be deposited by gravity in said low-angle position.

Another object of the invention is to provide a cap delivery device of the gravity type which is adapted to present the cap to the moving container at a small angle, and is adapted to be readily adjusted for presentation of the cap to the container at different low angles.

Another object of the invention is to provide a cap delivery device of the gravity type which is simple in construction and efficient in operation.

Other objects of the invention will appear from the detail description.

The invention consists in the several features hereinafter set forth, and more particularly defined by claims at the conclusion hereof.

In the drawings:

Fig. 1 is a side elevation of the cap delivery device, and a portion of the conveyor for continuously moving the containers and a portion of the sealing mechanism;

Fig. 2 is a section of the cap delivery device taken on line 2—2 of Fig. 3;

Fig. 3 is a front elevation of the cap delivery device;

Fig. 4 is a detail perspective of the holder for the caps into which the caps are successively delivered from the runway for low-angle presentation to the moving containers; and Fig. 5 is a section taken on line 5—5 of Fig. 2.

The improved cap delivery device is exemplified in a sealing machine which includes a continuousy driven, endless conveyor 10 for the filled containers for progressive delivery to the cap delivery device; and sealing means of any suitable type exemplified by a driven pressure belt 12, by which the caps are pressed onto the jars. The upper reach of conveyor 10 is supported for horizontal travel, and the sealing means may be of any suitable type well-known in the art.

The head spaces and upper portions of the filled containers on conveyor 10 are usually passed under a steam chest 14 for evacuating the air from the head spaces to produce a sub-atmospheric pressure or vacuum in the containers after they have been sealed, as well understood in the art.

The improved cap delivery device includes a runway generally designated as 16, which is adapted to serially hold the caps inclined at a sufficient angle to cause the caps to gravitate in the runway. The runway includes a bottom 18 on which the caps slidably rest, side bars 20 for guiding the caps transversely, and a central longitudinal top bar 22, which is fixedly supported by cross-bars 23, which are secured to side-bars 20. From the runway 16 the caps are delivered by a holder generally designated as 24, which is adapted to support each cap when it is displaced from the runway, at a low or small angle relatively to the horizontal plane of movement of the upper ends of the containers for engagement by the containers and displacement from the holder so the cap will be positioned into a nearly horizontal position on and more nearly centralized position over the container as the cap is displaced from the holder. This holder may be formed of sheet metal and comprises a bottom member which includes side-rails 26 integrally connected by a cross-member 28, upstanding integral side members 30 and inwardly extending or inturning stop members 32 at the front end of side members 30. The holder 24 is supported from bottom 18 of the runway by a depending plate 34, the upper end of which is fixedly secured to the lower end of bottom 18 and a hinge-pin 36 which extends through an eye 37 integral with plate 34 and eyes 38 integral with the holder.

The holder is supported for pivotal or angular adjustment on pin 36, by a link 40, which is pivotally connected by a screw 41 to one side 30 of the holder, and is provided adjacent its upper end with an elongated slot 42. A rod 44 extends through lugs 45 which are fixed on the top of bottom 18 and rod 44 is provided at one end with a head 46 engaging one of the lugs 45, and at the opposite end with a clamping nut 47, by which the link 40 may be rigidly clamped in its adjusted position to support the holder 24. Thin resilient strips 48 are secured to the outer faces of the sides 30 of the holder, and provided with inwardly curved terminals 49 which are adapted to engage the depending flange of the cap and arrest and position the cap on the bottom of the holder. The inturned stop members 32 of the holder 24 are disposed above the cap on the bottom 28, and are adapted to arrest a superimposed cap until the cap on bottom 28 is displaced from said bottom. When the cap on the bottom is displaced from the holder, the leading portion of the superimposed cap will drop below stop members 32 onto the bottom 28, where it will be free to slide forwardly into position to be arrested by the terminals 49 of resilient strips 48. The lower inner corners of inturned members 32 are bent downwardly and forwardly or flared downwardly so that the leading portion of the cap will drop freely onto the bottom of the holder.

The operation of the cap delivery device will be as follows: The runway 16 will be loaded with caps which will slide downwardly by gravity and in succession, due to the downward inclination of the runway which is greater than the angle of repose of the caps. The first cap delivered into the runway will slide on runway bottom 18 until the leading side drops onto the side-rails 26 of holder-bottom 28. The angle of inclination of the cap will be increased so its trailing end will drop off the lower end of the runway onto the holder-bottom until it is arrested by the curved ends 49 of resilient strips 48, as illustrated by the cap a. When thus supported, the cap will be at a lesser inclination and positioned at a lower angle relatively to the top of the container than the caps in the runway. While resting on the bottom 28 of the holder, the lower rim of the leading portion of the cap a, as shown in Fig. 2, will be positioned so that the upper end of the container will engage the cap for displacement from the holder by the container.

The succeeding cap b will slide down the runway until its leading portion is superimposed and rests on the cap a which rests on the bottom of the holder. The trailing portion of cap b will rest on the lower end of bottom 18 of the runway, and its leading portion will be arrested by members 32 as shown in Fig. 1. The superimposed cap b will remain in said position until the lowermost cap a is displaced from the holder.

The continuously moving conveyor 10 moves jars d to initially engage the inner periphery of the leading portion of the cap a and slide the cap forwardly off the holder-bottom 28, on which it is held at a low angle relative to the top of the container until the cap a is displaced from said holder-bottom. The trailing portion of the cap a will then drop so that the cap will be supported horizontally on the container and be carried forward with the container to the sealing belt 12 for applying the necessary pressure to seal the cap on the container and until the vacuum is formed to permanently secure the cap sealed on the container. As the cap a is displaced from the holder 24, the leading portion of the cap b will drop to the holder-bottom 28, and will be pushed forwardly by the cap c until the cap b drops and slides into the low angle position on the bottom of holder 24, while the first cap c will slide forwardly by gravity until it is superimposed on the top of the cap b then on the holder-bottom and arrested by inturned members 32, thus assuming the position left by the cap b. In like manner, the succeeding caps will be delivered onto the holder bottom as the caps are carried by the containers to the sliding mechanism.

By supporting the cap a at a low angle relatively to the top of the jars, the cap drops onto the jar without likelihood of cocking, so that the sealing ring in the cap is uniformly distributed around the jar.

In order to accurately position the leading portions of the caps for engagement by the upper ends of the containers and for containers varying in height, the holder can be pivotally adjusted on pin 36. Upon loosening the nut 47, holder 24 can be pivotally adjusted. After being adjusted, the nut 47 is tightened to secure the holder in its assigned position.

In the operation of the feeding device, the reduced angle of presentation of the lowermost cap to the jar prevents the usual gasket on the inner periphery of the skirt of the cap from being engaged below the portion of the jar which is finished for sealing engagement, so that there will be no uneven distribution of the sealing gasket when the cap is pressed onto the jar to complete the seal. This reduced angle of presentation of the cap to the jar also lessens the escape of steam from the head space of the jar between the time the jar leaves the steam chest and the time when the cap is forced onto the jar, which results in a higher vacuum in the sealed jar. The cap in the chute resting on the cap in the holder exerts only a slight drag or resistance to the cap on the bottom of the holder, which aids in retaining the cap last mentioned engaged by the moving jar as the cap is pulled from the holder. The gravitational pressure of the series of caps in the runway is exerted against the cap restrained by the stops 32, which relieves the cap in the low-angle position of such pressure. The cap which is positioned for engagement by the jar, is free except for a slight drag of the superimposed cap for advance by the jar. When the cap, held by stops 32, is released, it drops freely into the low-angle position in the holder.

In delivery devices in which the cap presented for engagement by the jar, and the cap is subjected to gravitational pressure of the caps in the runway, spring-loaded stops of considerable magnitude are required for preventing such pressure from driving the lowermost cap in the runway beyond the stops, and the resistance of these stops may be sufficient to tip the jar. In fully loading runways with stops of this character, the impact of the caps against the cap presented to the jar, may be sufficient to force the lowermost cap from the spring stops.

In the present construction the gravitational pressure of the caps in the runway is exerted upon the cap b which is positively held by stops 32, and the impact of the caps in loading the runway is against the cap b which is positively held and will not be transmitted to the cap a which is presented for engagement by the jar, and the slight retardance to the cap a will not tip the jar.

The invention exemplifies a cap delivery mechanism for continuously moving conveyors by which gravity-fed caps will be supported in a low-angle position when engaged by the containers for causing the caps to drop onto the containers with the sealing rings in the caps uniformly distributed around the jar.

The invention also exemplifies a cap delivery mechanism for continuously moving containers by which the gravity-fed caps will be supported in a low-angle position for engagement by the containers, and by which caps will be successively superimposed on the lowermost cap and successively delivered by gravity to said low-angle position for engagement by the container.

The invention also exemplifies a cap delivery device of this type which provides for accurate adjustment of the holder for engagement and displacement of the cap by containers.

The invention is not to be understood as limited to the details described, since these may be modified within the scope of the appended claims without departing from the spirit and scope of the invention.

Having thus described my invention, what I claim as new and desire to secure by Letters Patent is:

1. In a device for delivering caps to continuously conveyed containers, the combination, with a runway for the caps inclined for gravitation of the caps toward the path of the top of the containers, of a holder for receiving caps from the runway, pivotally supported on and below the lower end of the runway, including a bottom support for the caps inclined at a lesser inclination than the runway, and positioned to support a cap for engagement by the containers, side-guides for the caps on the bottom support, inwardly extending stop members on the holder, for arresting the next succeeding cap with its leading portion resting on the top of the cap on the bottom support and its trailing portion on the lower end of the runway, said stop-members being adapted to drop the leading portion of said succeeding cap on the bottom support upon displacement of the preceding cap from the bottom support by the container, and means for securing the holder against pivotal movement.

2. In a device for delivering closure caps to progressively conveyed containers, the combination, with a runway for caps inclined for gravitation of the caps, of a bottom support for holding caps spaced downwardly from the lower end of the runway at a lesser inclination than the caps in the runway and in position for engagement by the containers; a hanger depending from the lower end of the runway, on the lower end of which the bottom support is connected; side-guides for the cap on the bottom support; inturned members on the side guides for arresting the next succeeding cap from the runway with a portion thereof resting on the top of the cap on the bottom support and spaced vertically from the bottom support to permit said succeeding cap to drop to the bottom support when the preceding cap on the bottom support is displaced by the container.

3. In a device for delivering closure caps to progressively conveyed containers, the combination, with a runway for caps inclined for gravitation of the caps, of a bottom support for holding caps spaced downwardly from the lower end of the runway at a lesser inclination than the caps in the runway and in position for engagement by the containers; a hanger depending from the lower end of the runway, on the lower end of which the bottom support is pivotally connected; side-guides for the cap on the bottom support; inturned members on the side-guides for arresting the next succeeding cap from the runway so that a portion thereof will rest on the top of the cap on the bottom support and spaced vertically from the bottom support to permit said succeeding cap to drop onto the bottom support when the preceding cap is displaced from the bottom support by the container, and means for locking the bottom support against pivotal movement.

4. In a device for delivering closure caps to progressively conveyed containers, the combination, with a runway for caps inclined for gravitation of the caps, of a bottom support for holding caps spaced downwardly from the lower end of the runway at a lesser inclination than the caps in the runway and in position for engagement by the containers; a hanger depending from the lower end of the runway, on the lower end of which the bottom support is supported; resilient means for holding the cap on the bottom support; side-guides for the cap on the bottom support; inturned members on the side-guides for arresting the next succeeding cap from the runway so that a portion thereof will rest on the top of the cap on the bottom support and spaced vertically from the bottom support to permit said succeeding cap to drop onto the bottom support when the preceding cap on the bottom support is displaced by the container.

5. In a device for delivering closure caps to progressively conveyed containers, the combination, with a runway for caps inclined for gravitation of the caps, of a bottom support for holding caps spaced downwardly from the lower end of the runway at a lesser inclination than the caps in the runway and in position for engagement by the containers; a hanger depending from the lower end of the runway, to the lower end of which the bottom support is pivotally connected; resilient means for holding the cap on the bottom support; side guides for the cap on the bottom support; a link between one of the side-guides and the runway, clamping means for the link, inturned members on the side-guides for arresting the next succeeding cap from the runway so that a portion thereof will rest on the top of the cap on the bottom support and spaced vertically from the bottom support to permit said succeeding cap to drop onto the bottom support when the preceding cap on the bottom support is displaced by the container.

6. In a device for delivering closure caps to progressively conveyed containers, the combination with an inclined runway for guiding caps in side-by-side succession for gravitation from its lower end; of holding means below and for receiving caps from the runway and by which the cap will be stationarily retained at an angle with its leading portion in the path of and directly engageable and displaceable from the holding means by the container; and means for arresting a succeeding cap from the runway so that its leading portion will rest on the top of the cap held on the holding means until the underlying cap is displaced and then drop onto and be retained on said holding means into position for engagement and displacement by a successive container.

7. In a device for delivering closure caps to progressively conveyed containers, the combination with an inclined runway for guiding caps in side-by-side succession for gravitation from its lower end; of stationarily supported holding means below and for receiving caps from the runway and by which the cap will be retained at an angle with its leading portion in the path of and directly engageable and displaceable from the holding means by the container; and means for arresting a succeeding cap from the runway so that its leading portion will rest on the top of the cap held on the holding means until the underlying cap is displaced and then drop into position onto and be retained on said holding means into position for engagement and displacement by a successive container.

8. In a device for delivering closure caps to progressively conveyed containers, the combination with an inclined runway for guiding caps in side-by-side relation for gravitation from its lower end; of holding means below and for receiving caps from the runway and by which the leading portion of a cap will be stationarily retained at a lesser inclination than the caps in the runway with its leading portion in the path of and directly engageable and displaceable from the holding means by the container; means for arresting a succeeding cap from the runway so that its leading portion will rest on the top of the cap held on the holding means until the underlying cap is displaced, and then drop into position onto and be retained on said holding means into position for engagement and displacement by a successive container, and means for stationarily retaining the holding means in different angles relatively to the runway.

EDMOND H. LYON.

REFERENCES CITED

The following references are of record in the file of this patent:

UNITED STATES PATENTS

| Number | Name | Date |
|---|---|---|
| 1,615,040 | Risser | Jan. 18, 1927 |
| 1,964,078 | Podel | June 26, 1934 |
| 2,168,055 | Stellitano | Aug. 1, 1939 |
| 2,352,764 | Bell | July 4, 1944 |
| 2,355,479 | Stover | Aug. 8, 1944 |
| 2,361,364 | Bell | Oct. 31, 1944 |